May 17, 1938.  H. L. MILNER  2,117,674

VARIABLE OR CONTROLLABLE PITCH AIR SCREW

Filed Nov. 18, 1935   2 Sheets-Sheet 1

Inventor
Harry L. Milner
By
Atty.

May 17, 1938.  H. L. MILNER  2,117,674
VARIABLE OR CONTROLLABLE PITCH AIR SCREW
Filed Nov. 18, 1935   2 Sheets-Sheet 2
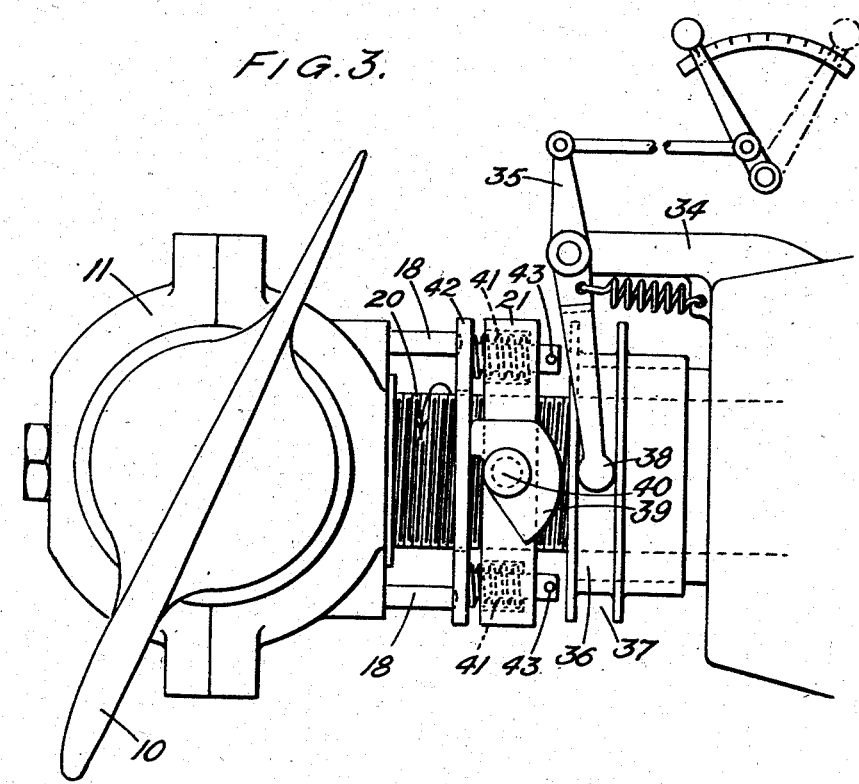
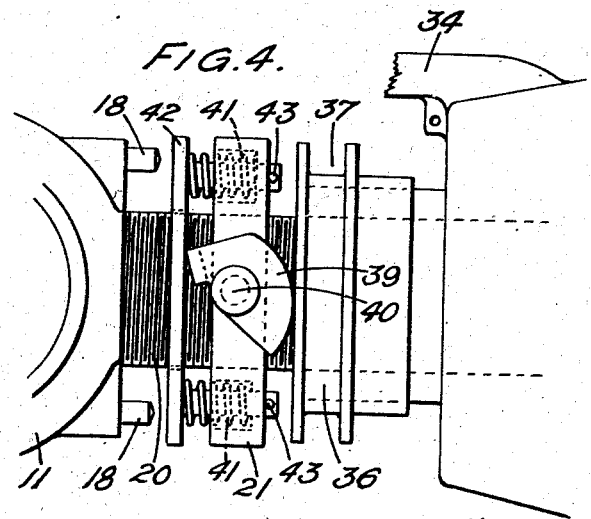

Patented May 17, 1938

2,117,674

UNITED STATES PATENT OFFICE

2,117,674

VARIABLE OR CONTROLLABLE PITCH AIRSCREW

Harry Lawley Milner, Gotherington, England

Application November 18, 1935, Serial No. 50,424
In Great Britain November 23, 1934

6 Claims. (Cl. 170—162)

This invention relates to variable or controllable pitch airscrews and seeks to provide improved pitch varying and/or controlling means. An object of the present invention is to provide a variable or controllable pitch airscrew which requires no other control than the engine speed control or throttle, although in some cases it may be found convenient to provide a manually operated adjustment to obtain the range of pitch settings which may be desired. In such cases, however, the actual pitch control will be dependent on engine speed variations and thus controlled by the throttle. A further object of the invention is to provide the mechanism of a variable or controllable pitch airscrew disposed conveniently in the hub, so that the airscrew may be built possessing simplicity of construction, reliability and aptitude to withstand heavy stresses.

The invention depends to some extent, though not necessarily, on the blades being of such a nature that they have a tendency to vary their pitch during rotation. This tendency may be due to one or more forces acting on the blades when the airscrew is rotated; such forces include, for example, centrifugal and aerodynamic loads. The effect of such forces may be modified in their effect by means auxiliary to the blades, e. g. appropriately positioned auxiliary masses or centrifugal masses mechanically connected to the blades. It is presumed in the descriptions of various forms of the invention that the tendency is to reduce the pitch of the blades when R. P. M. are increased, although it will be understood that by suitably designing the blades or appertaining pitch changing mechanism this tendency may perhaps be reversed and the direction of operation of the controlling mechanism would then, where required, be suitably modified.

According to the invention broadly stated, a variable or controllable pitch airscrew comprises blades, tending to change their pitch on effective rotation of the airscrew, mounted for angular movement substantially about their longitudinal axes and, in respect of such movement, being limited or controlled by means moving axially relative to the propeller shaft, which axial movement is itself limited or controlled by means adjusted by changes of rotational speed or angular acceleration of the airscrew.

The means adjusted by changes of speed may be sensitive to accelerations or decelerations of the rotational speed.

The said means may take the form of what may be termed an inertia member which, in one form of the invention hereafter described, comprises a flywheel rotatable with the airscrew but also rotatable thereto, being carried on a thread or helix so that relative rotation produces axial displacement. The airscrew thus comprises bearings for blades capable of resisting centrifugal loads (as well as other loads to which the blades are subject), the blades being provided with a crank or equivalent device co-operating with a member, such as a sleeve, slidable axially relative to the propeller shaft. Axial movement of the member permits and controls the angular movement of the blades. The blades are resisted in their rotation by some form of resilient resistance preferably comprising a spring. The axial movement of the member is then arranged to be limited or controlled by the rotation of the inertia member relative to the shaft when comparatively accentuated rotational accelerations or decelerations of the airscrew take place. According to a further feature of this form of the invention, means are provided whereby the completion of a required movement of the blade or blades may in certain conditions lock the flywheel or equivalent against relative rotation. Means may also be provided whereby by the provision of an over-riding manual control the relative rotation of the flywheel may be arrested at desired points, thereby providing for a plurality of pitch settings.

In order that the invention may be more readily understood several forms are illustrated in the accompanying drawings, in which:—

Figure 3 shows in elevation a modification of the hub shown in Figures 1 and 2 incorporating a manually adjustable stop for the flywheel.

Figure 4 is a similar view of the hub shown in Figure 3, the parts being in a different position.

Figure 1:
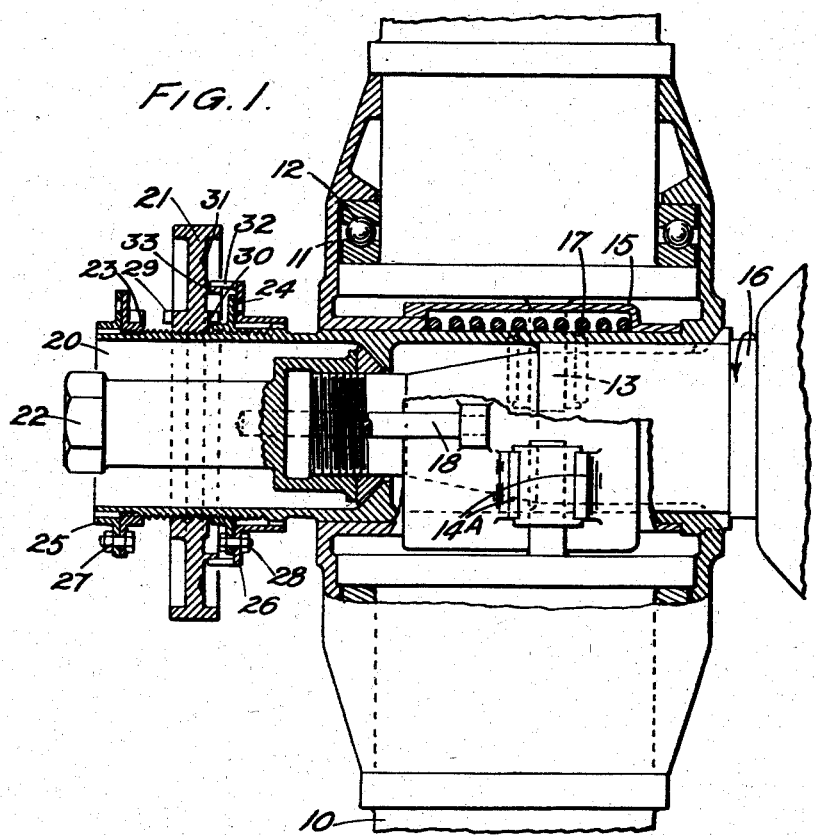
Figure 1 shows a partial section of a form utilizing a flywheel as the adjustable means for limiting the axial movement of the pitch controlling member.

Referring firstly to features of design common to both forms of the invention illustrated and shown in most of the figures, blades 10 are mounted for angular movement in the hub 11 about their longitudinal axes, that is to say about their axes substantially at right angles to the axis of the airscrew. Antifriction bearings, such as 12, may be arranged to withstand centrifugal loads due to the blades. Each blade is rigidly connected to a crankpin 13 rotatable in a sliding block 14 co-operating with jaws 14A on a sleeve 15. Sleeve 15 is concentric with the propeller shaft 16, so that sliding of the sleeve parallel to the shaft results in simultaneous and corresponding adjustments of pitch of the blades 10. Interposed between the sleeve 15 and shaft 16 is positioned a compression spring 17 which presses the sleeve 15 into such a position that the blades 10 are held in maximum pitch when the airscrew is at rest, and at rotational speeds below that at which the tendency of the blades to change their pitch overcomes the spring 17, with a resulting change of pitch of the blades. The speed at which this occurs will be presumed to be, during the description that follows, 500 R. P. M. The sleeve 15 carries stop rods 18 passing through the hub at 19.

Figure 2:
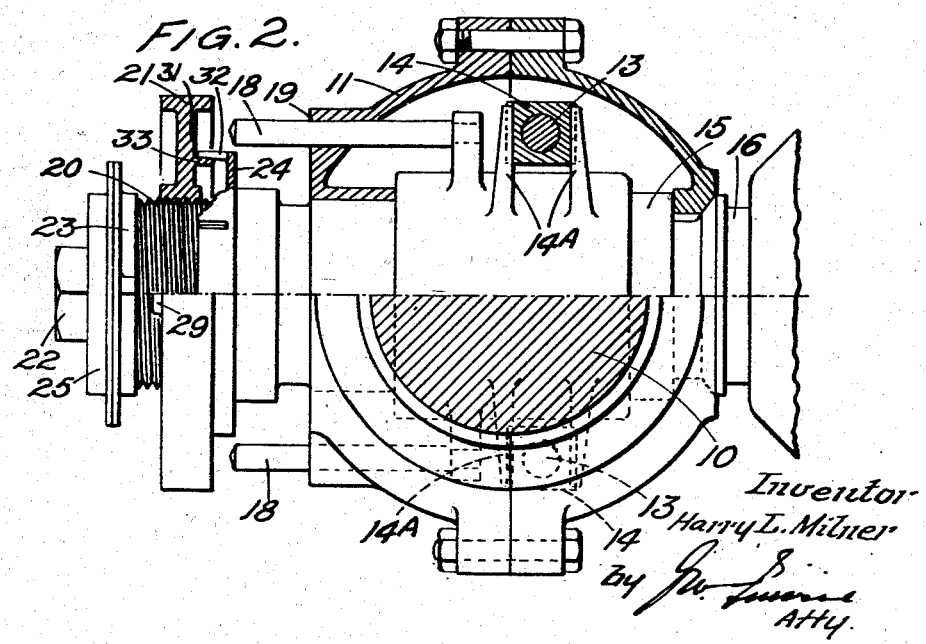
Figure 2 is a half section taken at right angles to that shown in Figure 1.

In Figures 1 and 2 the airscrew hub 11 carries an extension 20 which is screwed and carries a flywheel 21. The hub and extension are secured to the shaft 16 by being splined and retained by the nut 22. Screwed rings 23 and 24 which can be secured to splined sleeves 25 and 26, respectively, by bolts 27, 28 in such a manner that the rings may be locked in several positions on the screwed extension 20. These adjustments are provided for adjusting the limiting positions of the flywheel 21 on the screw 20, whilst the plane is on the ground. Projections 29 and 30 on the flywheel engage corresponding projections on the screwed rings 23 and 24 when the flywheel reaches its limiting position. The figures show the flywheel in the extreme right position and in this position the rods 18 abut against the flywheel when the engine speed exceeds 500 R. P. M. and the blades are retained in the maximum pitch setting. Suitable depressions 31 are provided on the flywheel engaged by the extremities of the rod and thus lock it against rotation.

The splined sleeve 26 is provided with a flexible extension 32 of spring steel arranged to engage a circular projection 33 on the flywheel in such a way that, at a certain speed of rotation, the extension under the action of centrifugal force deflects outwards from the axis of rotation and offers no restraint to rotation of the flywheel relative to the shaft. This braking mechanism is provided to prevent hunting of the flywheel when the engine is idling. In Figure 1, the direction of rotation of the airscrew is shown by the arrow on the airscrew shaft 16.

The operation of the airscrew as described is as follows. When the airscrew is at rest or at speeds below 500 R. P. M., the spring 17 presses the sleeve 15 to the position at which the blade pitch setting is at a maximum. At speeds of 500 R. P. M. and over, the tendency of the blades to change to minimum pitch compresses the spring, and the sleeve 15 moves with the rods 18 to the left until engaged by the flywheel, and the blades are locked at a fixed pitch. Now, if it be assumed that the flywheel is in a position as shown in Figures 1 and 2, being gripped by the auxiliary device 32, if the speed of rotation of the airscrew is increased at a moderate rate at a certain speed the flange 32 will release the flywheel, but the latter will continue to partake of the rotation of the airscrew because of the general friction of the screw thread. In order to reduce pitch, the speed of rotation is first reduced to permit the spring 17 to withdraw the rods 18 from the flywheel, the engine is then rapidly accelerated, and, owing to the thread and the inertia of the flywheel, the latter moves along the extension 20 to meet the stop on the ring 23, where it is held by its inertia until the critical speed is passed and the rods 18 reach the flywheel. The blades have then moved to the minimum pitch position and are held in this position. Increasing the speed does not affect the pitch of the blades as the controlling sleeve 15 is locked against further movement by the abutment of the rods 18 against the flywheel. In order to change the pitch from minimum to maximum during flight, the engine speed is reduced below 500 R. P. M. and the rods move to the right, under the influence of spring 17, releasing the flywheel which, on account of its inertia, rotates relative to the shaft and travels to the right along the screw until arrested by the stop on the ring 24. On re-acceleration of the engine the rods 18 again abut against the flywheel and the blades are at maximum pitch.

It will be appreciated that it is possible to change the pitch from one extreme to the other defined by the initially adjustable stops, and that, by providing the stops with faces parallel to the shaft axis, the relative rotation of the flywheel is arrested without binding of the screw thread in a manner such as might occur if the abutting faces were normal to that axis.

The above described form of the invention has only two working positions, and, as it may be desired to provide for the control of pitch settings intermediate those limits, a form of invention incorporating such a device in the form of an overriding hand-control is illustrated in Figures 3 and 4.

In Figures 3 and 4, the hub extension 20 extends rearwardly and thus lies between the hub and the engine. Stop rods 18 in this case extend rearwardly from the hub towards the engine and when fully extended from the hub correspond to a minimum pitch position. Thus, the internal arrangement of the sleeve within the hub and the connections of the blades to the sleeve are reversed, the spring urging it to the left to result in maximum pitch setting of the blades. The flywheel 21 is rotatable on the extension and, when in the extreme left position on the extension, the blades are held at maximum pitch setting. A lug 34 is rigidly attached to some point on the engine or cowling to support a lever 35 connected to a suitable manual control positioned in the cockpit to move a sleeve 36. The sleeve 36 is preferably supported on a suitable slide associated with the engine, and thus does not contact with the rotating driving shaft 16. Wear may thus be reduced. The sleeve 36 forms a stop analogous to that provided by the ring 23 in Figures 1 and 2, but is in this case axially movable relative to the extension 20, thereby providing a stop which is adjustable in position during flight.

In order that physical contact between the flywheel and the sleeve 36 may be normally broken, in order to reduce wear on the pin 38 on the lever 35 in the groove 37 of the sleeve 36, there are provided cam-like members 39 pivoted at 40 on the exterior cylindrical surface of the flywheel. The cams 39 are arranged to present their curved surfaces towards the sleeve 36. A stop is formed on each cam to engage a corresponding projection on the face of the sleeve 36 and a stop plate 42 carried by pins 43 passing through the flywheel, springs 41 being provided on the pins tending to separate the stop plate and the flywheel. The centre of mass of each cam is at a point to the right of the pivots 40 so that on acceleration or deceleration of the flywheel the cams tend to lag behind the flywheel.

Presuming the airscrew is rotating in the direction shown by the arrow when a rapid acceleration takes place, the flywheel will travel along on the screw towards the sleeve 36 and an increase of rotational speed of the flywheel will result, and the cams will take up the attitude shown in Figure 4. When the flywheel reaches the sleeve 36 the stop on the cam engages the projection on the sleeve and relative rotation of the flywheel to the member 20 ceases. On further increase of speed, the blades move towards minimum pitch and the rods 18 move to the right and abut against the plate 42 and compressing the springs 41 turn the cams 39. Physical contact between the flywheel and sleeve 36 is thereby broken and the blades locked in the desired position by abutment of the rods 18 against the stop plate 42.

It will be understood that the scope of the invention is in no way limited to the forms shown and described. It should also be noted that although the invention has been described throughout as applied to a two bladed airscrew it is not limited to this form and indeed is easily adaptable to a three or four bladed airscrew.

What I claim is:—

1. A controllably variable pitch airscrew comprising in combination a hub, blades mounted therein for angular pitch-changing movement, abutment means controlling said angular pitch-changing movement and movable in an axial sense in the hub, and an inertia mass which is mounted coaxially with the airscrew shaft for angular movement thereabout by accentuated changes of rotational speed of the airscrew, and cooperating with said abutment means to govern the axial position thereof.

2. A controllably variable pitch airscrew comprising in combination a hub, blades mounted therein for angular pitch-changing movement, abutment means movable axially relative to the airscrew axis in response to such angular pitch-changing movement, a flywheel mounted for rotation coaxially with the airscrew shaft, such rotation being effected by accentuated changes in rotational speed of the airscrew, and means carried by said flywheel cooperating with said abutment means to govern the axial movement thereof.

3. A controllably variable pitch airscrew comprising in combination a hub, blades tending to change their pitch on effective rotation of the airscrew mounted in the hub for angular pitch-changing movement, abutment means controlling said pitch-changing movement and movable in an axial sense, resilient means opposing the tendency of the blades to change pitch which means is overcome by such tendency at a predetermined speed, a flywheel mounted for rotation coaxially with the airscrew shaft, such rotation being effected by accentuated changes in rotational speed of the airscrew, and means carried by said flywheel and cooperating with said abutment means when said resilient means is overcome to govern the axial movement thereof.

4. A controllably variable pitch airscrew comprising in combination a hub, blades tending to change their pitch on effective rotation of the airscrew and mounted in said hub for angular pitch-changing movement, abutment means controlling said pitch-changing movement and movable in an axial sense, a threaded extension on said hub, a flywheel carried by said extension and rotatable relative thereto for axial displacement thereon to govern the axial movement of said abutment means by cooperation of a face of said flywheel with said means.

5. A controllably variable airscrew as set forth in claim 1 further provided with a manually operable stop for varying the limit of movement of the mass in one direction and thereby vary the extent of permitted travel of the abutment means.

6. A controllably variable pitch airscrew as set forth in claim 1 including a manually adjustable stop for varying the limit of movement of the mass in one direction and movement of the blades in pitch, together with means for breaking physical contact between the flywheel and adjustable stop.

HARRY LAWLEY MILNER.